Nov. 20, 1951

R. M. BAKER 2,575,702

VACUUM TUBE OSCILLATOR

Filed June 16, 1949

INVENTOR

Robert M. Baker.

BY F. E. Browder

ATTORNEY

Patented Nov. 20, 1951 2,575,702

UNITED STATES PATENT OFFICE 2,575,702

VACUUM TUBE OSCILLATOR

Robert M. Baker, Catonsville, Md., assignor to Westinghouse Electric Corporation, East Pittsburgh, Pa., a corporation of Pennsylvania Application June 16, 1949, Serial No. 99,411

8 Claims. (Cl. 250—36)

My invention relates to vacuum tube oscillator circuits and to apparatus using the same. More particularly, it relates to arrangements for neutralizing lead inductance in oscillator circuits, and to stabilizing oscillator circuits by proper use of the neutralizing scheme.

In vacuum tube oscillator circuits, it is common practice to use transmission lines as tank elements for the oscillator. A serious disadvantage of this practice, is, however, the fact that these lines must be made much shorter than their theoretical resonant value would indicate. This disadvantage is caused by the internal impedance of the tube or tubes used in the circuit. The interelectrode tube capacity shunts the ends of the line, thus reducing its effective length. While this shunting effect may be reduced to a minimum by use of a transmission line having a low surge impedance, this reduction in surge impedance accentuates the series inductance of the tube leads, and results in a considerable shortening of the line. The present invention aims to overcome the difficulties set forth above.

It is, accordingly, an object of the invention to provide a simple means for neutralizing the lead inductance in oscillator circuits of the above type, and to permit the use of transmission lines having nearly their theoretical resonant length.

Another object of the invention is to provide a simple compact variable capacity which may be incorporated directly in the lead of a tube, and in series relation with it.

Another object of the invention is to provide an arrangement which not only neutralizes the lead inductance of a tube, but when used in a tube plate circuit serves to insulate the plate from the source of plate voltage.

Still another object of the invention is to provide a lead inductance neutralizing scheme which is applicable, not only to vacuum tubes of widely varying types, but also to tank circuits in general, where inductance and capacity are in series relation and it is desirable to keep the inductance at a minimum.

A still further object is to provide a compact radio frequency generator employing the lead inductance neutralizing scheme with consequent simplification and improved efficiency.

Another and further object of the invention is to provide a simple and effective means of stabilizing a radio-frequency oscillator, and to so arrange a tuning line of the oscillator that a plurality of voltage nodes can be produced by suitable location of a line coupling capacity.

Among the novel features of my invention, are those particularly set forth in the appended claims. The invention itself, however, both as to its organization and its method of operation, together with further objects and advantages thereof, will best be understood from a consideration of the following description of certain specific embodiments, taken in connection with the accompanying drawings, in which:

Figures 1, 2, 3:
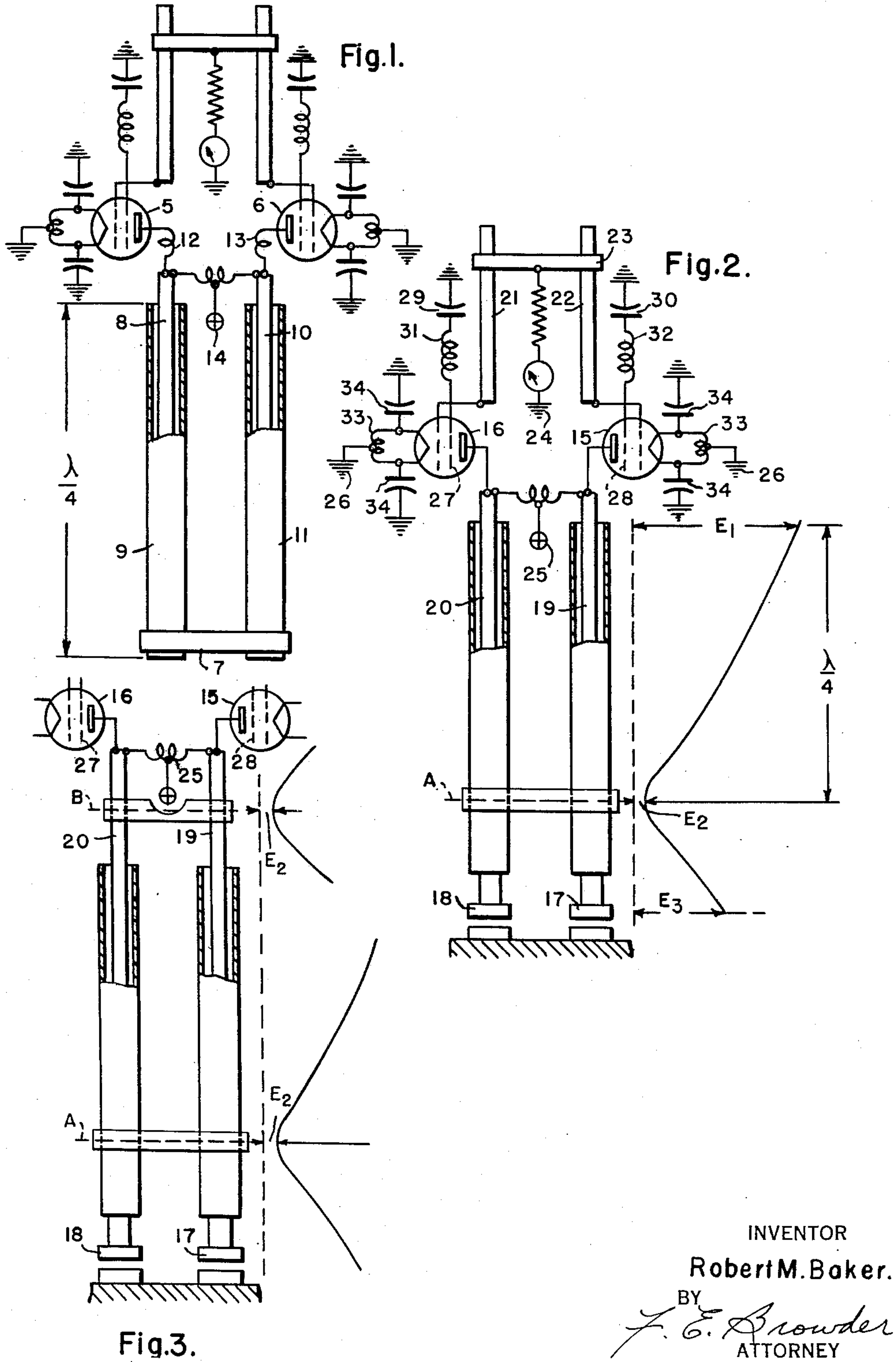
Figure 1 is a schematic diagram representing one means embodying my invention, for neutralizing lead inductance in a vacuum tube oscillator circuit, and in which the neutralizing capacity is in series relation with the plate.
Figure 2 is a diagram showing the neutralizing scheme embodied in a radio-frequency oscillator apparatus suitable for use in bonding sheets of plastic or similar material, provided with a stabilizing means embodying the invention.
Figure 3 is a diagram showing a modification of the scheme of Figure 2, in which modified oscillator stabilizing means are employed.

Referring first to Fig. 1 of the drawings, reference characters 5 and 6 designate two thermionic tubes such as may be employed in a vacuum tube oscillator circuit, these being shown, by example, as tetrodes. The plates of these tubes are connected to the two sides of a transmission line, these sides being made up of two telescoping capacity elements shunted by a low resistance bridge element 7. The capacity elements are preferably concentric tubes which are relatively adjustable to vary the capacity. The element associated with tube 5, for example, is made up of a fixed inner rod-like or tubular member 8, and an outer movable tubular member 9. Similarly the element associated with tube 6 comprises a fixed inner member 10 and an outer movable member 11. In practice, any suitable means may be provided for holding the members 9 and 11 in axially adjusted position, with their parts concentric. The bridge or shunt 7 may be fixed to the members 9 and 11 and hence adjustable with them, or it may be independently adjustable.

As pointed out above, the purpose of the present invention is to neutralize the lead inductance of a tube by means of a capacitive reactance. The lead inductance of tube 5 is indicated at 12, and that of tube 6 at 13. The capacitive reactance of elements 8 and 9 is, therefore, made approximately equal to the inductance 12 so as to nullify the inductance of the plate lead. Similarly the capacitive reactance of elements 10 and 11 is made to nullify the inductance 13 of the plate of tube 6. With this adjustment, full plate voltage will appear at the plate end of the transmission line. This arrangement has the advantage not only of neutralizing the lead inductance, but it also insulates the plate output circuit from the direct current source applied to the plate of the tube as at 14.

While the scheme is shown in Fig. 1 as embodied in a circuit utilizing tetrodes, where it presents the added advantage that the capacity shunting the end of the line is that between the plate of the tube, and the screen grid which operates at substantially radio-frequency ground potential, it is also obviously useful with triodes. The invention is also applicable to the grid circuit of an oscillator for neutralizing its lead inductance.

Fig. 2 shows an application of the invention to a radio-frequency generator employing tetrodes and utilizing the lead inductance neutralization scheme of Fig. 1, in both the plate and grid circuits. In Fig. 2 there is shown a small compact radio-frequency generator so constructed that a number of units may be mounted side by side on an automatic machine for the manufacture of mattresses, floats and similar articles of tufted construction and made from sheets of synthetic plastic or other similar materials.

Such an oscillator must operate at sufficiently high frequency that fusing, bonding or forming of the material may be accomplished with a single application of power for a few seconds only, without voltage breakdown. The power output capabilities must also obviously be sufficient to supply the power necessary.

The circuit is designed to bond two areas at a time under the electrodes indicated 17 and 18. In practice, when bonding two sheets of 0.02 inch thick "Vinylite" the effective area under each of the electrodes will be of the order of one to three square inches. The frequency will be of the order of 100 mc. and the power output of the order of two kilowatts.

With the plate lines somewhat more than one quarter wave length long ($\lambda/4$) the voltage distribution is as shown in Fig. 2, where $E_1$ is the full R. F. plate voltage or about 1.2 times the D. C. plate voltage. The line voltage drops to the low value $E_2$ at some point A above the loads and rises again to the value $E_3$ across the two loads. The capacity coupling arrangements cancels the plate lead inductance so that the plate lines have nearly the full resonant length as set forth above in connection with Fig. 1. Since the load is part of the oscillator tank circuit, the oscillator will shift frequency and continue to feed power into the load even with considerable change in load impedance. Of course, if the load changes too much the grid drive will no longer be correct and operation will not be possible.

The loading of the oscillator requires the choice of the proper value of characteristic impedance ($Z_o$) for the plate line which is given approximately by the equation:

$$Z_o=E_1\sqrt{\frac{X_c\times P.F.}{W}}$$

where $X_c$=capacitive reactance in ohms of the two loads in series
P. F.=power factor of the load (per cent)
W=desired power in watts with both loads
$E_1$=full R. F. plate voltage These lines will in practice generally have a diameter of about one to three inches with about four inches between centers.

The circuit shown in Figs. 2 and 3 employs tetrodes although triodes could be used equally well provided they have suitable frequency and power ratings.

In Fig. 2 the apparatus comprising a pair of tetrodes 15 and 16 having their plates connected respectively to electrodes 17 and 18 through lead inductance neutralizing capacitors 19 and 20. The control grid leads are similarly neutralized by an adjustable capacity shunt 21—22 having its bridging member 23 grounded as at 24. The plate loads of tubes 15 and 16 are insulated from the source of direct current which is applied at 25.

The filaments are grounded at D. C. as at 26 through the usual filament transformer 33 and to R. F. by capacitors 34 located as near the tube terminals as possible.

The screen grids 27 and 28 are also grounded with short wide strap leads through capacitors 29 and 30. The value of each of the screen-grid reactances designated 31 and 32 in Fig. 2 is only that of the lead inside the tube. The reactances of 29 and 30 are, respectively, less than those of 31 and 32, so that the screen-grids are in effect connected through the small predominating inductive reactance to ground.

A line similar to, but shorter than, the plate line is connected in the control grid circuit, as already indicated, so that the inductance in this circuit may be varied.

The control grids are driven through the plate to screen-grid and screen-grid to grid capacities inside the tubes. The necessary conditions for oscillation of the circuit of Fig. 2 are:

1. The value of the screen grid reactances 31 and 32 must be less than the internal capacitive reactance between plate and screen grid of the associated tube.

2. The total inductive reactance in the control-grid circuit must be greater than twice the internal reactance between the screen grid and control grid of one tube. The final adjustment of the grid drive is accomplished by varying the length of the control-grid line.

To make the oscillator less sensitive to changes in load impedance a low inductance (near short circuit) may be connected across the plate lines near the point A. This, of course, permits a detuning of the load circuit with large changes of load impedance, by merely unloading the generator and in some cases this is preferable to having the oscillator become overloaded or cease oscillation.

With the variable grid lines of proper length, the system shown in Fig. 2 oscillates. The capacity near the top of the anode lines constitutes an element of a series tuned network, the other element being the anode lead inductance. The oscillation voltage at the top of the anode line is, therefore, a maximum $E_1$. The minimum voltage $E_2$ occurs approximately a quarter wave length below the top of the line. The operating voltage $E_3$ is somewhat greater than $E_2$. To suppress interaction between the load and the remaining portions of the oscillator, a low inductance may be connected across the anode lines at A, the point of minimum voltage as stated above.

A variation of the series capacity arrangement is shown in Fig. 3 where the parts are similar to those of Fig. 2. Because of the plate lead inductance, it will be found generally that to obtain a frequency of 100 mc. or more, it is necessary to short circuit the plate line at some point B near its upper end, even though it is desirable to have the voltage minimum appear at point A just above the load. With the series capacity located at a point lower down on the transmission line, as shown in Fig. 3, it is possible for both minima to appear. This can be explained simply although not entirely accurately by saying that the series capacitive reactance exactly cancels the inductive reactance of the length of line between points A and B, and these two points may be thought of electrically as being one and the same point.

Consequently, in the arrangement of Fig. 3, the plate line is shorted at B near the top. The capacity coupling between the plate line and the load is disposed substantially below the point B. In this way, a point of minimum voltage is made to occur at B and another point at A where the series capacitive reactance cancels the inductive reactance of the line. The operating voltage is again somewhat greater than the minimum voltage.

If it is desirable to stabilize the oscillator and make it less sensitive to load changes, a low inductance may be connected across the plate line at point A of Fig. 3 just as was discussed above for the circuit of Fig. 2.

This scheme may obviously be used in transmission lines whenever it is desired to have two successive minima displaced along the line A by a distance less than one-half wave length so that two nodal points appear.

A practical embodiment of the scheme of Fig. 3 employs the following elements. The tubes employed are Eimac type 4–1000A with a D. C. plate voltage of 4000 volts and a plate dissipation 1 kw. per tube. The total length of the plate line to the load is approximately 24 inches. The upper section of the line is made from two inch copper pipe and the lower section from three inch copper pipe. Three inch wide copper straps approximately five inches long connect the lower ends of the plate lines to the loads.

Although I have shown and described only a few specific embodiments of my invention, many modifications and adaptations thereof will be apparent to those skilled in the art. My invention, therefore, is not to be limited except insofar as is necessitated by the prior art and by the spirit of the appended claims.

I claim as my invention:

1. In combination: a radio-frequency oscillator circuit employing a plurality of thermionic tubes, a transmission line comprising a plurality of conductors connected to corresponding electrodes of said tubes, and a capacitive reactance comprising a sheath and core of conductive material connected in each conductor of said line and being adjustable to such a value as to substantially neutralize the inductance of said line at the frequency of said oscillator.

2. The combination as set forth in claim 1 wherein said capacitive reactances are each made up of concentric relatively adjustable hollow tubes connected together at their ends remote from said tubes.

3. In a radio-frequency oscillator circuit comprising a plurality of thermionic tubes having their plates connected to a load subject to wide variations, a transmission line tank circuit comprising a plurality of conductors connected to said plates and having a capacitance comprising a sheath and core of conductive material in series with each conductor of said line adjustable so as to substantially neutralize the lead inductance of said line at the resonant frequency of said line, and low inductance means bridging said line to produce a voltage maximum substantially at the point where said load is connected.

4. A radio-frequency oscillator circuit comprising a plurality of thermionic tubes having their plates connected to a load subject to wide variations, a transmission line tank circuit connected to said plates and having a capacity produced by two coaxial conductors in series with each conductor of said line and adjustable so as to substantially neutralize the lead inductance of said line at its resonant frequency, and an inductance bridge across said line between said tubes and said load and arranged to produce a region of maximum potential at the place where said load is connected to said line.

5. A radio-frequency oscillator circuit comprising a plurality of thermionic tubes having their plates connected to a load subject to wide variations, a transmission line tank circuit comprising a pair of conductors connected to said plates and having a capacity produced by two coaxial conductors in series with each of said conductors of said line adjustable so as to substantially neutralize the lead inductance of said line at its resonant frequency, and bridging means connected across said line to reduce the voltage variations produced in said circuit by changes in said load.

6. A radio-frequency oscillator circuit comprising a plurality of thermionic tubes, a transmission line comprising two electrically conducting paths each of which comprises a first cylindrical conductor connected at one end to said tubes, a hollow cylindrical conductor disposed so that part of said hollow conductor surrounds said first conductor, and connections for connecting a load to said hollow cylindrical conductor, a low impedance conductor connected between said paths at such a position as to cause a region of high potential to be produced at said connections for connecting a load.

7. High frequency heating apparatus comprising an oscillator circuit including a plurality of thermionic tubes, a transmission line connected to said tubes so that said line is included in the tank circuit of said oscillator, said line comprising two electrically conducting channels each of which includes a first cylindrical conductor, a hollow cylindrical conductor partially enclosing said first conductor but physically separated from said first conductor, the distance which said first conductor extends into said hollow conductor being adjustable to vary the capacitance therebetween, a load connected to said transmission line, a low impedance shunt movably connected between said channels at such a distance from said load as to cause a voltage maximum to be produced in the region of said load.

8. Apparatus as set forth in claim 7 wherein another low impedance shunt is provided across said transmission line more distant from said load than the first mentioned shunt whereby to reduce the voltage variations produced in said circuit by changes in said load.

ROBERT M. BAKER.

REFERENCES CITED

The following references are of record in the file of this patent:

UNITED STATES PATENTS

| Number | Name | Date |
|---|---|---|
| 2,404,640 | Lawrence | July 23, 1946 |
| 2,414,991 | Wheeler | Jan. 28, 1947 |